Aug. 31, 1937. T. K. GREGORIUS ET AL 2,091,314
DOUBLE WINDOW CONSTRUCTION
Filed Dec. 13, 1935
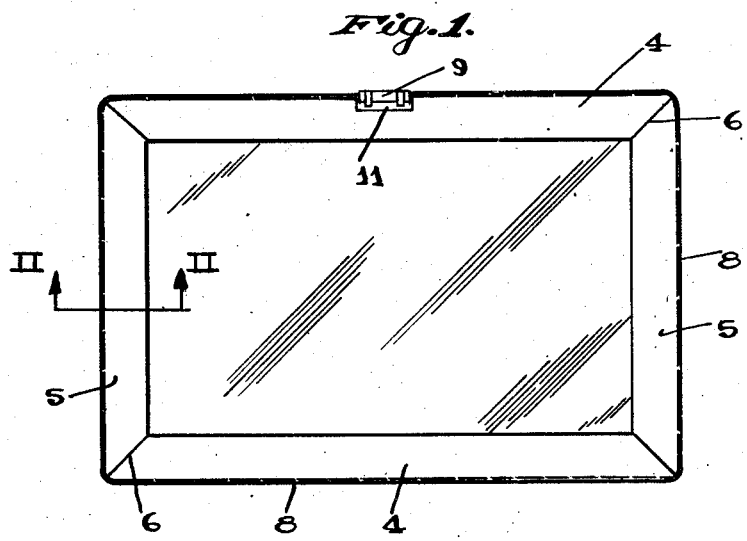
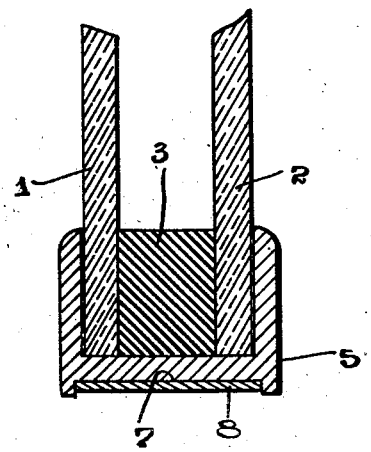
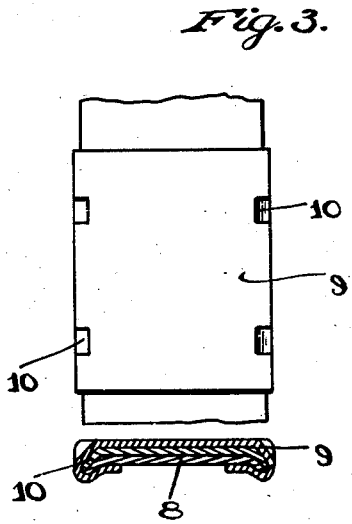
INVENTORS.
T. K. Gregorius
C. E. Strand
BY Bradley + Bee
ATTORNEYS.

Patented Aug. 31, 1937

2,091,314

UNITED STATES PATENT OFFICE 2,091,314

DOUBLE WINDOW CONSTRUCTION

Thomas Karl Gregorius, Tarentum, and Charles E. Stroud, Ford City, Pa., assignors to Pittsburgh Plate Glass Company, a corporation of Pennsylvania Application December 13, 1935, Serial No. 54,272

2 Claims. (Cl. 20—56.5)

The invention relates to double windows which ordinarily comprise a pair of glass sheets with a spacer between their margins and a light metal frame of U cross section in which the edges of the sheets are seated. The metal frame is usually made up of four sections, one for each side of the window, and means are required for securing them together at the corners of the window. This has been heretofore accomplished by the use of solder or by the provision of interlocking means, both of which involve considerable expense and labor and are open to certain objections. The heat developed in soldering tends to injure the spacer (usually of rubber) and renders the disassembling of the unit difficult, while a mechanical interlock adds materially to the cost, and in many cases, is difficult to release when replacement of one of the glass sheets is required. The object of the present invention is to provide an efficient substitute for the corner securing means heretofore employed, and one which is much cheaper and which involves no difficulty in disassembling. One embodiment of the invention is illustrated in the accompanying drawing, wherein:

Figure 1 is a side elevation of the complete unit. Fig. 2 is a section on an enlarged scale on the line II—II of Fig. 1. And Fig. 3 is a detail in plan and in section of the clamping means for the band which holds the unit in assembled relation.

Referring to the drawing, 1 and 2 are a pair of glass sheets of similar size and shape, and 3 is a spacer between the edges of the sheets at their peripheries, such spacer being preferably of rubber, although any suitable spacing means may be employed. The frame consists of four sections 4, 4, and 5, 5 of U cross section, as indicated in Fig. 2, which sections meet at their ends along the bevel lines 6, as indicated in Fig. 1. The frame sections are preferably of extruded metal, such as aluminum, and fit over the edges of the units so that the rubber spacers 3 are under some compression and the space between the glass sheets is hermetically sealed off from the outer atmosphere. The bases of the U sections are provided with similar recesses 7, as shown in Fig. 2, and lying in these recesses is a clamping band 8, which serves to hold the sections in assembled relation. This clamping band is of thin sheet metal, such as iron, brass or stainless steel, and its thickness will vary depending upon the size of the unit. For a small unit, the thickness of the band need not be over 1/64th of an inch. The ends of the band overlap, as indicated in Figs. 2 and 3, and in assembling, a suitable tool is employed to place the band under tension, after which the clamping sleeve 9 is applied.

As indicated in Fig. 3, this clamping sleeve is of sheet metal, and after it is positioned, a suitable tool is employed to crimp the metal, as indicated at 10, thus producing corresponding bends in the overlapping ends of the band and insuring a very positive clamping action to prevent separation of the units. Various means may be employed to clamp the ends of the band together, the one shown being preferred, because it is relatively flat and can be made to lie within the recesses 11 (Fig. 1) provided in the frame member 4.

The use of the expedient above described obviates the use of soldering material at the corners where the frame sections meet and gives a unit of greater strength and rigidity than those heretofore employed having soldered or interlocking corners. The appearance of the unit is also improved, as the corners present a better appearance than is the case where the corners are soldered or interlocked, and the use of the recesses for the band 8 not only assures the band against displacement, but also conceals it when the unit is viewed from the side. When it becomes necessary to disassemble the unit, this can be very easily accomplished by severing the band. The expedient is applicable to any type of U frame either of the unitary type, as shown, or one in which the U section is in two parts with such parts in interlocking relation in a manner well known in the art, the invention being illustrated in the drawing in its simplest form only.

What we claim is:

1. In combination in a double glazed unit, a pair of parallel glass sheets with a spacer between the edges thereof, a frame for the unit comprising a plurality of metallic members of U cross section which receive the edges of the sheets to hold them against the sides of said spacer and which meet at their ends, such members being provided on the outer sides of the base portions with recesses extending throughout their length, a metal clamping band extending around the periphery of the unit and lying in said recesses, and means for securing the ends of the band together.

2. In combination in a double glazed unit, a pair of parallel glass sheets with a spacer between the edges thereof, a frame for the unit comprising a plurality of metallic members of U cross section which receive the edges of the sheets to hold them against the sides of said spacer and which meet at their ends, such members being provided on the outer sides of their base portions with recesses extending throughout their length, a metal clamping band extending around the periphery of the unit and lying in said recesses, with their ends in overlapping relation and a clamping sleeve for said ends.

T. KARL GREGORIUS.
CHARLES E. STROUD.